July 15, 1930. A. E. PREYER 1,770,531
MEANS AND METHOD OF MAKING CORD TIRES
Filed Oct. 12, 1927 2 Sheets-Sheet 2
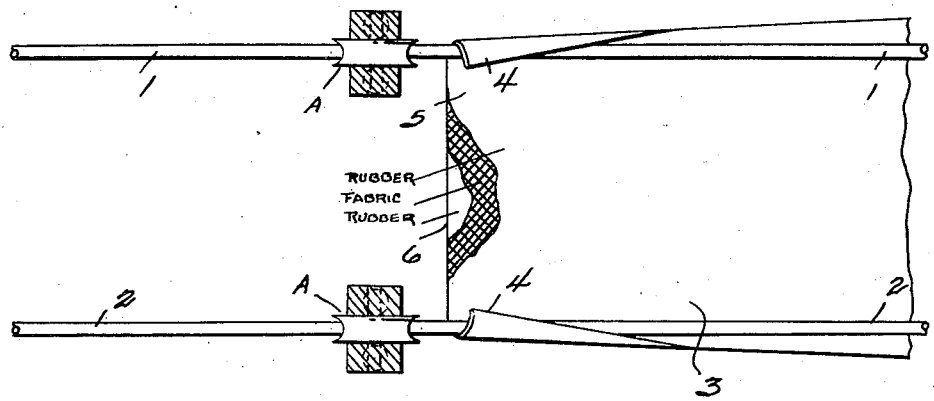
- FIG - 3 -
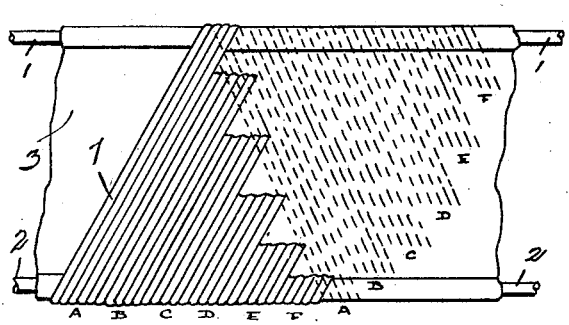
- FIG - 4A -
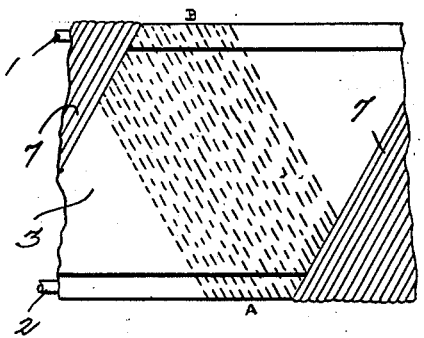
- FIG - 4B -
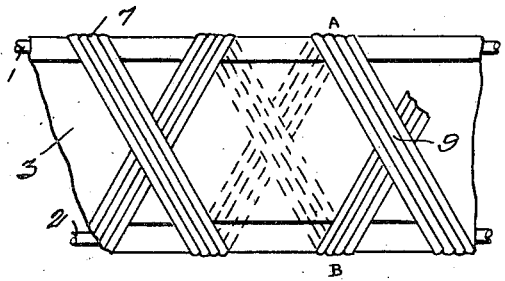
- FIG - 5 -
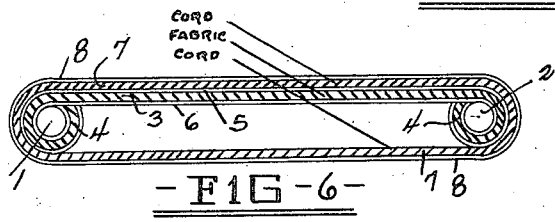
- FIG - 6 -
INVENTOR.
ARTHUR E. PREYER,
BY
ATTORNEY.

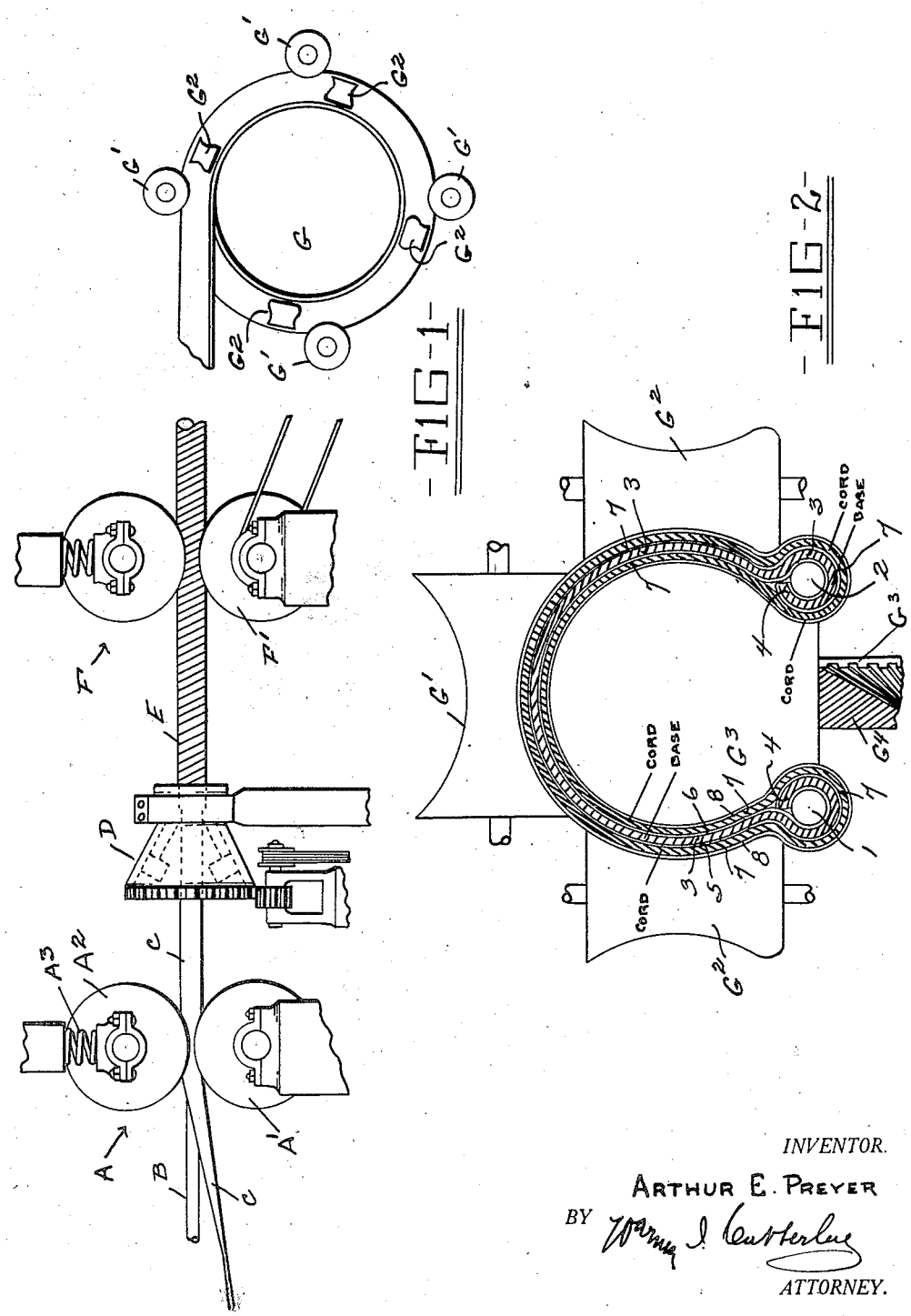

Patented July 15, 1930

1,770,531

UNITED STATES PATENT OFFICE

ARTHUR E. PREYER, OF WASHINGTON, DISTRICT OF COLUMBIA

MEANS AND METHOD OF MAKING CORD TIRES

Application filed October 12, 1927. Serial No. 225,686.

My present invention, in its broad aspect, has reference to improvements in means and methods of forming pneumatic tire casings, and more particularly it is my purpose to improve upon methods of fabricating so-called "cord" carcasses for tire casings to the end that a greatly improved carcass will be produced at less cost than heretofore. It is the practice in the art to first build up the web or cord-and-fabric body, and then build into it the bead portions; and thereafter mold and cure the structure of the tire thereabouts. Others have found it expedient to incorporate the beads directly within the cord-and-fabric body during its formation. However, considerable difficulty has been experienced and much effort has been expended in producing a web or cord-and-fabric body wherein the beads are embedded, and wherein the ends of the cords cannot unravel, and wherein the cords and underlying base are adapted to withstand the many different stresses and strains to which a tire is subjected, and wherein the laminations of cord, rubber and fabric are formed into a cohesive, unitary structure under uniform tension. Still other methods with which I am acquainted propose to develop a cord-and-fabric body upon a platen or the like using a liner thereon for positioning the fabric during the operation of winding the cord thereabouts. Still others develop the structure on a ring, and many propose complicated methods wholly unadapted to commercial production; such as making a tube on a mandrel and afterwards inserting the bead forming material.

My present method, as distinguished from others in the art, contemplates the elimination of a platen or guide, and a liner as a conveyor; I guide and sustain the bead elements of my structure by means of grooved rollers, and build up the cord structure directly upon a body formed of any suitable material, such as fabric, cord, or rubber, or the like, carried by the bead elements instead of utilizing a liner or liners as a conveyor. Furthermore, my process or method is adapted for the production of a cord structure having any desired number of superposed layers, and the manner in which the cord is applied eliminates free ends which are likely to become unraveled, and it also eliminates cut cord ends at or near the beads which is a desirable feature. As a base for my structure I use a flat strip of any suitable pliable material, such as fabric, cord, or rubber sheeting, which is impregnated or treated top and bottom with unvulcanized rubber. The edges of the strip are turned about the bead elements, and about the whole is continuously wound the cord which is laid at any desired angle, preferably from 30° to 55°. The cording may first be covered or impregnated with rubber gum, or a thin sheet of unvulcanized rubber may be inserted above and below the cord structure. The body so formed is now pressed to form a cohesive mass, and the ends of the beads joined to form a ring which is given the shape of the tire and is then adapted to receive thereon the material forming the body of the tire, and the lining, walls, bead toes, breaker strip and tread; it is now ready to be cured in the manner well known in the art.

Other equally important objects of my invention may be briefly defined as follows:—First, the bead elements are carried directly by the roller, and the base is fed upon the beads and the edges of the base turned about the beads so that the beads support and carry the base during its progress through the apparatus by which the structure is made, and afterwards the base encloses and supports the beads; second, the cord structure is wound upon the base and about the beads as it is drawn through my apparatus; third, the structure may be formed in its flattened embodiment as it is passed between the last set of rollers instead of both flattened and given the tire shape on flattening and shaping apparatus; fourth, the structure and the steps in the formation of the structure, i. e., the process, are adaptable for the utilization of rubber impregnated fabric or cord, or the like, or the use of unvulcanized rubber sheeting, and fifth, my invention is characterized by the production of a high degree of cohesiveness, durability, ability to withstand strain imposed from any angle, efficiency, and the ease with which the cord structure may be manufactured in quantities.

Other and equally important objects and advantages will become apparent as the description of my invention proceeds but while I have in the present instance defined for the sake of illustration an article of a certain specific form, and the process of so forming it, it will be understood that I do not desire to limit myself thereby except as may be indicated by the scope of the claims appended hereto and forming a part of this specification.

In the drawings wherein is illustrated an embodiment of my invention:—

Figure 1 is a diagrammatic view of the apparatus used in manufacturing my cord structure, and shows the sequence of the steps taken, Figure 2 is a diagrammatic sectional view taken through the structure as it is carried by the shaper and shows the relative positions of the fabric, rubber, and cord layers, Figure 3 is a diagrammatic detail view of the manner of applying the base to the bead elements, Figure 4$^a$ is a detail view of the manner of applying a single ply cord body, the separate wraps of cord being designated A, B, C, D, E and F, Figure 4$^b$ is a detail view of the manner of applying the respective free ends of the single wrap, two ply cord body, to the end that unraveling will be prevented, in this view A and B designate the respective ends, Figure 5 is a detail view of the manner of applying a double wrap, two ply cord body, A and B designating the respective plies, and Figure 6 is a transverse section taken through the structure and shows the disposition of the laminations thereof.

In the drawings like characters of reference are used to designate like or similar parts throughout the several views.

Referring particularly to Figure 1, wherein the various steps in the process of manufacture of my cord tire structure are diagrammatically illustrated, A designates the first set of rollers, of which A′ is one of a pair of idler rollers, and A$^2$ one of a pair of resiliently mounted rollers which are disposed above and opposed to the idler rollers; A$^3$ designates the spring journals for rollers A$^2$. The cooperating pairs of rollers are spaced apart from each other to receive the bead elements B. The base C, which is a pliable strip formed of fabric, cord, rubber sheeting, or any other suitable material, is fed onto the beads with its edges overlapping the same as the beads pass between the pairs of rollers to the cord wrapping machine D, where the cord body E is applied; and thence to a second set of rollers F (which are similar to rollers A) and of which rollers F′ are power driven to draw the structure forward. Upon leaving the rollers F the structure is passed to a shaper G having tread shaping rollers G′; side rollers G$^2$, a ring G$^3$, and a gear power connection G$^4$, see Figure 2. The rollers G′ are in advance of the rollers G$^2$ to properly feed the structure on the shaper so that the plies will be smoothed and pressed from the tread portion down along the sides. If desired the structure may be pressed flat at the time it passes between rollers F, in which case a press drum (not shown) would be utilized. Consequently the steps in manufacturing my completed article may be briefly outlined, in sequence, as follows:—

1. Feeding the beads, and the base upon the beads with its edges turned about the beads, between a primary set of rollers, 2. Forming the cord body thereon, 3. Passing the structure through another set of rollers, certain of which are powered, and at which time, if desired the structure may be pressed and flattened by a press drum located between the rollers, and 4. Shaping the structure into a ring (tire shape) joining the ends of the beads and smoothing down the cord ends.

In practice it has been found desirable to cut the bead elements to the length determined by the circumferential measurements of the resulting ring, so that a cutting-off operation is eliminated.

Coming now especially to the formation of my cord body, per se, as distinguished from the apparatus used and the steps taken in utilizing said apparatus:—

The numerals (1) and (2) designate the bead elements which are carried and supported by grooved rollers A and F. The base (3) is a flat strip of any suitable pliable material, such for instance as fabric, cord, unvulcanized rubber sheeting or the like, here described as fabric for the purpose of this description of my structure. The base (3) is disposed with its edges (4) turned about the bead elements (1) and (2) and both the top and bottom thereof is covered with unvulcanized rubber as at (5) and (6), or if desired the fabric, or base material, may be impregnated with rubber. The cord body (7) is applied on the base and about the beads carried by the base, by continuously winding the strands thereof about the base at an angle of from 30 to 55 degrees, and the cord body may be either first covered with unvulcanized rubber as at (8), or a sheet of unvulcanized rubber may be laid above and below it. The several wraps A, B, C, D, E and F forming the single wrap, two ply cord body are shown in Figure 4$^a$, and the free ends A and B, see Figure 4$^b$ are smoothed down as shown in this figure to prevent unraveling. When it is desired to produce a double wrap, four ply cord body, the top layer of cords is wound at an angle reverse to the lower layer as shown at (9), in Figure 5, the two wraps being designated A and B. Any number of layers or plies of cord may be applied in a similar manner.

The completed structure is now pressed into a cohesive mass, and formed into a ring and the ends of the bead elements joined and the cord ends smoothed out as shown in Figure 4ᵇ. The structure is now ready to receive the material of the body of the tire. It will therefore be seen that this aspect of my method contemplates the following operations:—

1. Spacing the beads on the grooved rollers,
2. Disposing thereon the pliable base with the edges thereof engaging about the beads, and covered top and bottom with unvulcanized rubber,
3. Applying a continuous winding of rubber treated cord at an angle of from 30 to 55 degrees, and
4. Pressing into a cohesive mass, shaping into a ring, joining the ends of the bead elements, smoothing down the cord ends, and finally giving the structure the horse shoe or tire shape preparatory to building up the tire body thereon. All of the phases of this step can be consolidated by utilizing the shaper G, or the flattening process may be carried out separately at the time the structure passes through roller F by using a press-drum.

While in the foregoing there has been illustrated in the drawings and described in the specification such combination and arrangement of elements as constitute the preferred embodiments of my invention, it is nevertheless desired to emphasize the fact that interpretation of my invention should only be conclusive when made in the light of the subjoined claims.

I claim:—

1. The method of forming a cord tire structure consisting in enclosing bead elements in the over lapped edges of a base whereby the base is wholly supported by the bead elements, covering said base both top and bottom with rubber, winding about said base and bead elements a cord covering, and then pressing the structure into a cohesive mass.

2. The method of forming a cord tire structure consisting in enclosing bead elements in the overlapped edges of a fabric base whereby the base is wholly supported by the bead elements, covering said base both top and bottom with rubber, winding at an angle about said base and bead elements a cord covering, and then pressing the structure into a cohesive mass.

3. The method of forming a cord tire structure consisting in enclosing bead elements in the overlapped edges of a fabric base whereby to wholly support the base on the beads, covering said base both top and bottom with rubber, winding at an angle about said base and bead elements a cord covering, applying rubber to said cord covering, and then pressing the structure into a cohesive mass.

4. The method of forming a cord tire structure consisting in enclosing bead elements in the overlapped edges of a fabric base whereby to wholly support the base on the beads, covering said base both top and bottom with unvulcanized rubber, winding at an angle about said base and bead elements a cord covering, applying unvulcanized rubber to said cord covering, and then pressing the structure into a cohesive mass.

5. The method of forming a cord tire structure consisting in wholly supporting a rubber impregnated or covered fabric base on spaced bead elements, and winding about said base and bead elements a cord covering thereby to form a cohesive mass comprising the bead elements, fabric base and cord covering.

6. The method of forming a cord tire structure consisting in wholly supporting a rubber impregnated or covered fabric base on spaced bead elements, and then winding at an angle about said base and bead elements a cord covering thereby to form a cohesive mass comprising the bead elements, fabric base and cord covering.

7. The method of forming cord tire structure consisting in feeding a pair of bead elements between spaced apart sets of rollers, feeding on the bead elements as they enter the rollers a base element with its edges turned about the beads thereby to support the base on the beads, winding a cord body about the base and bead elements, and then shaping the resulting structure into a ring and joining the ends of the bead elements.

8. The method of forming a cord tire structure consisting in feeding bead elements between rotating supports, disposing upon the bead elements a base with the edges thereof turned about the beads thereby to support the base wholly on the beads, winding a cord body about the base and bead elements as the same passes between the supports, and then pressing the structure and giving it a ring or annular and finally the horseshoe or tire shape and joining the ends of the beads.

9. The method of forming a cord tire structure consisting in feeding a pair of bead elements of a length approximating the circumferential measurement of a resulting tire between sets of roller supports, feeding on the bead elements a base as it enters the roller support and turning the edges of the base about the beads thereby to support the base wholly on the beads, winding a cord body on the base and beads, pressing the structure, forming it into a ring, giving it the shape of a tire, joining the bead ends, and finally smoothing down the terminal ends of the strands composing the cord body.

10. The method of forming a cord tire structure consisting in supporting a pair of bead elements so that they may be moved along in spaced apart relationship, feeding on the spaced beads a base member with its edges turned about the beads thereby to support the base wholly on the beads, winding a cord body about the base and beads as the structure is moved along, and finally forming the resulting structure into a tire shaped ring with the bead ends joined and the terminal ends of the strands forming the cord body smoothed down.

11. The method of forming a cord tire structure consisting in mounting a pair of bead elements in a support adapted to feed the bead elements through a cord winding machine and thence to a shaper, feeding onto the beads a base with its edges engaging completely about the beads whereby to wholly support the base on the beads, then winding the cord about the base and beads, and finally giving the resulting structure the desired shape.

12. Apparatus for forming a cord tire structure comprising spaced apart sets of rollers, bead elements carried forward by the rollers, one set of which is powered, a cord winding machine located between the spaced sets of rollers, and a shaper to which the bead elements are delivered from the last set of rollers, said bead elements adapted to receive thereon a base element to wholly support the base prior to and during the winding thereabouts of the cord body.

13. Apparatus for forming a cord tire structure comprising spaced apart sets of rollers certain of which have resilient or yielding mountings, bead elements carried between the sets of rollers, one set of which is powered to move the bead elements, a cord winding machine located between the spaced sets of rollers, and a shaper to which the bead elements are delivered from the last set of rollers, said bead elements adapted to receive thereon a base element to wholly support the base prior to and during the winding thereabouts of the cord body.

In testimony whereof, I affix my signature hereunto.

ARTHUR E. PREYER.